(12) United States Patent
Wang et al.

(10) Patent No.: US 8,714,114 B1
(45) Date of Patent: May 6, 2014

(54) LEASH ASSEMBLY

(76) Inventors: Tina Ting-Yuan Wang, Cupertino, CA (US); Michael Clair Houston, Cupertino, CA (US); Kevin Kin-Wai Lau, San Diego, CA (US)

( * ) Notice: Subject to any disclaimer, the term of this patent is extended or adjusted under 35 U.S.C. 154(b) by 206 days.

(21) Appl. No.: 13/275,061

(22) Filed: Oct. 17, 2011

(51) Int. Cl.
*A62B 35/00* (2006.01)
*A01K 27/00* (2006.01)

(52) U.S. Cl.
USPC .......... 119/770; 119/795; 224/184; 224/195; 224/660; 2/338

(58) Field of Classification Search
USPC ............... 119/770, 792, 793, 794, 856, 857; 224/195, 184, 660; 2/227, 338
See application file for complete search history.

(56) References Cited

U.S. PATENT DOCUMENTS

| | | | |
|---|---|---|---|
| 3,477,410 A * | 11/1969 | Lettieri | 119/794 |
| 3,868,786 A * | 3/1975 | Lippe et al. | 446/28 |
| 4,977,860 A * | 12/1990 | Harwell | 119/794 |
| 5,080,045 A * | 1/1992 | Reese et al. | 119/795 |
| 5,638,772 A * | 6/1997 | Kaufmann et al. | 119/770 |
| 5,950,569 A * | 9/1999 | Perrulli | 119/770 |
| 6,192,835 B1 * | 2/2001 | Calhoun et al. | 119/792 |
| 6,837,188 B1 * | 1/2005 | Martin | 119/792 |
| 2004/0112303 A1 * | 6/2004 | Moulton, III | 119/795 |
| 2005/0229867 A1 * | 10/2005 | Green | 119/770 |
| 2009/0235431 A1 * | 9/2009 | Bevley | 2/227 |
| 2009/0255486 A1 * | 10/2009 | Thompson et al. | 119/794 |
| 2010/0024742 A1 * | 2/2010 | Honeycutt et al. | 119/795 |
| 2010/0089338 A1 * | 4/2010 | Stern | 119/770 |
| 2012/0067297 A1 * | 3/2012 | Reyes | 119/792 |

* cited by examiner

*Primary Examiner* — Rob Swiatek
*Assistant Examiner* — George Andonyan

(57) ABSTRACT

A leash assembly includes a belt and at least one connector piece coupled to the belt. The belt can be worn by a subject around the torso, shoulders, neck or wrist. Each connector piece is configured to move along at least a portion of the belt. In some embodiments, the connector piece is a link configured to be receive the belt and to move along the belt. Alternatively, the belt has one or more tracks, in which the connector piece is configured to travel on thereby allowing the connector to travel along the belt. Each connector piece is coupled with a leash. In some embodiments, the leash has a retractable end. The leash assembly can include adornments and/or a carrier coupled to the belt.

17 Claims, 4 Drawing Sheets

LEASH ASSEMBLY

FIELD OF THE INVENTION

The present invention relates to an improved leash assembly, which allows a leash coupled with a belt to move along at least a portion of the belt.

BACKGROUND OF THE INVENTION

A leash can be used, for example, to control or restrain a child or an animal. However, prior art leashes suffer from a number of shortcomings. For example, many prior art leashes typically include a harness (i.e., body strap or neck strap) securely affixed at a single location on the harness worn by a child or animal. As a result, the leash may become tangled when the child or the animal rotates around a holder. In some cases, the prior art leash also does not provide sufficient anchorage. Furthermore, the other end of the prior art leash is typically held in a hand of a parent or owner. However, holding the leash by the hand may have adverse physical affects on the holder who must exert a force on a small area as they resist the motion of the tugging child or animal. The present invention addresses these limitations in the prior art.

SUMMARY OF THE INVENTION

A leash assembly includes a belt and at least one connector piece coupled to the belt. The belt can be worn by a subject, such as a person or an animal, around the torso, shoulders, neck or wrist. Each connector piece is configured to move along at least a portion of the belt. In some embodiments, the connector piece is a link configured to be received by the belt and to move along the belt. Alternatively, the belt has one or more tracks, in which the connector piece is configured to travel on thereby allowing the connector to travel along the belt. Each connector piece is coupled with a leash. In some embodiments, the leash has a retractable end. The leash assembly can include adornments and/or a carrier coupled to the belt.

In one aspect, a leash assembly includes a belt and at least one connector piece coupled to the belt. The belt is typically adapted to form a loop with an adjustable circumference. Each connector piece is configured to move along at least a portion of the belt. The leash assembly also includes at least one leash. Each connector piece is typically coupled with a first end of one of the at least one leash. In some embodiments, the connector piece is configured to release and retract the leash. In addition or alternatively, a second end of the leash can be coupled to a retractor for releasing and retracting the leash.

In some embodiments, the first end of the leash is configured to rotate about an axis substantially perpendicular to a face of the belt. In some embodiments, the leash assembly further includes an adornment coupled with the at least one connector piece. The adornment can be removable. In addition or alternatively, the leash assembly includes a carrier or a backpack coupled to the belt.

In some embodiments, the belt has an outer band and an inner band. In some embodiments, a single strand forms the outer band and the inner band. In other embodiments, the outer band and the inner band can be two separate bands coupled together as one. The connector piece is typically configured to receive the outer band. The belt also includes a buckle having a first portion and a second portion. The first and second buckle portions are adapted to fasten together. The inner and outer bands may be threaded through the first buckle portion, the second buckle portion or both. In addition or alternatively, the inner and outer bands may each be affixed to the first buckle portion, the second buckle portion or both. In some embodiments, when the inner band is tightened, the outer band is configured to loosen by the amount tightened. Similarly, when the inner band is loosened, the outer band is configured to tighten by the amount loosened. In other embodiments, the inner band and the outer band are configured to be adjusted simultaneously in the same direction.

In some embodiments, the belt includes a first track, and the connector piece is configured to move along the first track. In some embodiments, the first track is along a planar surface of the belt. In other embodiments, the belt further includes a second track, wherein the first track and the second track are parallel to the length of the belt. For example, the first track can be along a top portion of the belt and the second track can be along a bottom portion of the belt. In some embodiments, the connector piece is C-shaped and has a first end for coupling with the first track and a second end for coupling with the second track.

In another aspect, a leash assembly includes a link, a belt threaded through the link, and a leash coupled with the link. The link is typically configured to move along at least a portion of the belt. The belt includes an outer band and an inner band, wherein the link is configured to receive the outer band. The belt also includes a buckle. The buckle has a first portion and a second portion adapted to fasten with the first portion. The inner and outer bands are threaded through or affixed to the first portion, the second portion or both. In some embodiments, when the inner segment is tightened, the outer segment is configured to loosen by the amount tightened. Similarly, when the inner segment is loosened, the outer segment is configured to tightened by the amount loosened. In other embodiments, the inner band and the outer band are configured to be adjusted simultaneously in the same direction. In some embodiments, the inner band is wider than the outer band.

In yet another aspect, a leash assembly includes a belt including a first track, a connector piece configured to move along the first track, and a leash coupled with the connector piece. In some embodiments, the first track is along a planar surface of the belt. In other embodiments, the leash assembly further includes a second track, wherein the first track and the second track are parallel to the length of the belt. In some embodiments, the first track is at a top portion of the belt and the second track is at a bottom portion of the belt. For example, the first track can be along a top edge of the belt and the second track can be along a bottom edge of the belt. The connector piece is also configured to move along the second track.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

The present invention is directed toward a leash assembly. The leash assembly includes a belt and at least one connector piece coupled to the belt. The belt can be worn by a subject around the torso, shoulders, neck or wrist. The belt is typically adapted to form a loop. The belt can be worn by a person or by a pet, such as a dog. The belt is made of material such as, but not limited to, nylon, suede, leather, patent leather, reptile skins, and other suitable materials. Each connector piece is configured to move along at least a portion of the belt. In some embodiments, the connector piece is a link configured to receive the belt and to move along the belt. Alternatively, the belt has one or more tracks, in which the connector piece is configured to travel on thereby allowing the connector to travel along the belt. Each connector piece is coupled with a leash. In some embodiments, the leash has one or more retractable ends. The leash can have elastic properties. The leash assembly can include adornments and/or a carrier coupled to the belt.

FIGS. 1A-3 illustrate different embodiments of the leash assembly in accordance with the present invention. Specifically, as discussed in detail below, the leash assemblies shown FIGS. 1A, 1B and 2 allow a connector piece coupled with a leash to travel along a significant portion of the circumference of a belt but not necessarily the entire circumference of the belt. However, the leash assembly shown in FIG. 3 allows a connector piece coupled with a leash to travel along the entire circumference of a belt.

Figure 1A:
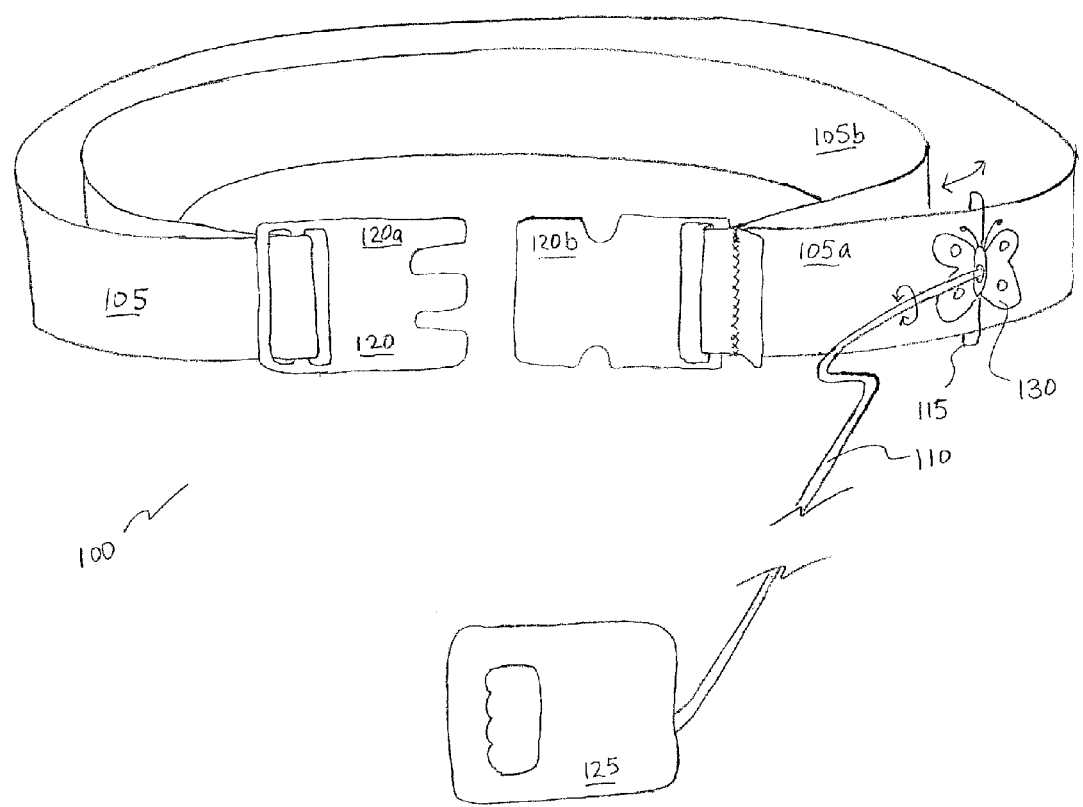
FIG. 1A illustrates a leash assembly using a double-stranded belt in accordance with an embodiment of the present invention.

FIG. 1A illustrates a leash assembly using a double-stranded belt in accordance with the present invention. The leash assembly 100 includes a belt 105, a connector piece 115, and a leash 110. The belt 105 includes an outer band 105a and an inner band 105b. The connector piece 115 is typically coupled with the outer band 105a and is configured to move along at least a portion of the belt 105, particularly the outer band 105a. The connector piece 115 is also coupled with the leash 110. In some embodiments, the connector piece 115 is configured to allow the leash 110 to rotate about an axis substantially perpendicular to a face of the belt 105. The connector piece 115 shown in FIG. 1A is a closed link. The closed link can be an O-ring, a D-ring, or a link with two parallel legs. Although the configuration of one connector piece 115 and one leash 110 is shown in FIG. 1A, other configurations can include multiple connector pieces, where each of the connector pieces is coupled with a leash.

The leash assembly 100 of FIG. 1A also includes a buckle 120. The buckle 120 has a first portion 120a and a second portion 120b. The first and second buckle portions 120a, 120b are adapted to fasten together. This type of buckle 120 typically prevents the connector piece 115 from being capable of traveling the entire circumference of the loop formed when the belt 105 is buckled. The belt 105 can be a single strand with first portion constituting the outer band 105a and a second portion constituting the inner band 105b. The single strand is coupled with both the first and second portions 120a, 120b of the buckle. The single strand is threaded through the first buckle portion 120a, the second buckle portion 120b, or both. In addition or alternatively, the single strand can be affixed to the first buckle portion 120a, the second buckle portion 120b, or both.

As shown in FIG. 1A, both the outer band 105a and the inner band 105b are threaded through the first buckle portion 120a. The first buckle portion 120a is configured to "grab" onto a portion of the belt 105 and prevents the belt 105 from being loosened from its configuration unless the belt 105 is manually adjusted. Typically, when the belt 105 is adjusted for fit, the outer band 105a and the inner band 105b move relative to each other. Specifically, when the inner band 105b is tightened, the outer band 105a is configured to loosen by the amount tightened. Similarly, when the inner band 105b is loosened, the outer band 105a is configured to tighten by the amount loosened. Put differently, when the belt 105 is loosened, a portion of the outer band 105a becomes the inner band 105b. And, when the belt 105 is tightened, a portion of the inner band 105b becomes the outer band 105a. Whereas the belt 105 is adjustable at the first buckle portion 120a, the belt 105 at the second buckle portion 120b is affixed to the second buckle portion 120b.

Figure 1B:
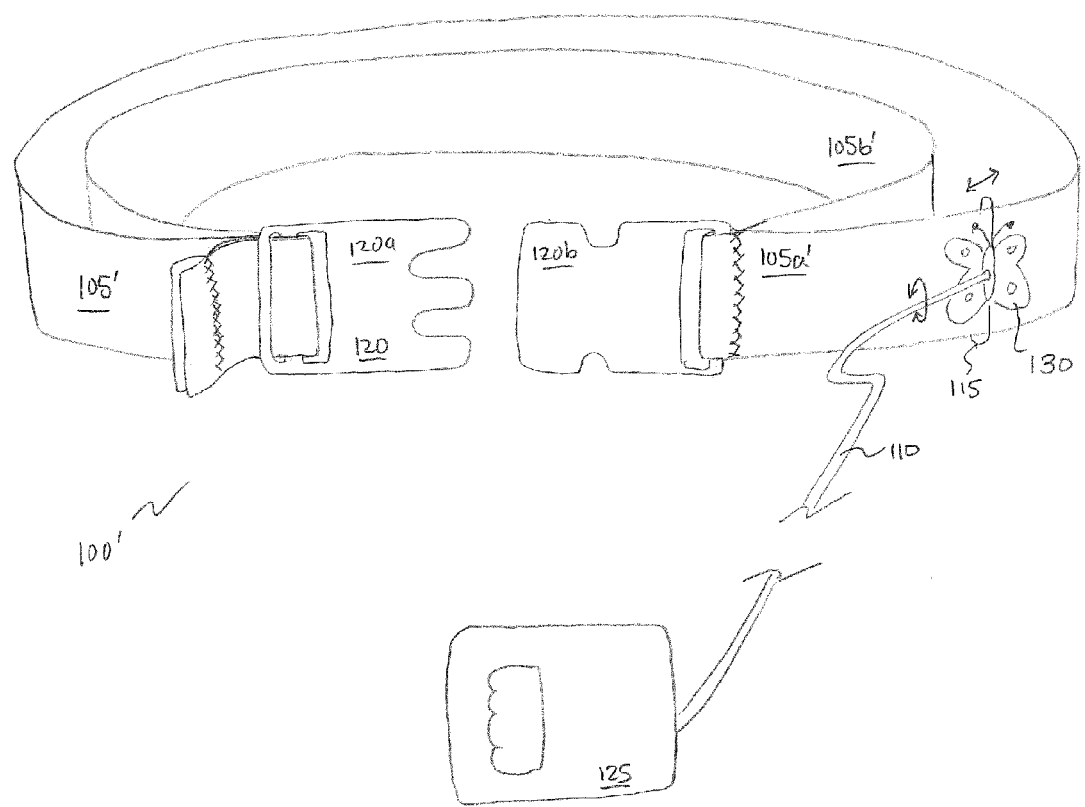
FIG. 1B illustrates another leash assembly using a double-stranded belt in accordance with an embodiment of the present invention.

Alternatively, both the outer band and the inner band are configured to be adjusted together in the same direction. As shown in FIG. 1B, the leash assembly 100' is similarly configured as the leash assembly 100. An approximate mid-point of the belt 105' is affixed to the second buckle portion 120b, while the two ends of the belt 105' are coupled together and threaded together through the first buckle portion 120a. Typically, the outer band 105a' is longer than the inner band 105b'. In some embodiments, the inner band 105b' is wider than the outer band 105a'. The first buckle portion 120a is configured to prevent the belt 105' from being loosened from its configuration unless the belt 105' is manually adjusted. An example is shown in FIG. 1B where the two ends of belt 105' are threaded through the first buckle portion 120a to prevent the belt 105' from being loosened. Typically, when the belt 105' is adjusted for fit, the outer band 105a' and the inner band 105b' are both simultaneously adjusted in the same direction so the space between the outer band 105a' and the inner band 105b' remains consistent.

Alternatively, each of the outer band and the inner band can have a separate adjustment "clip" (not illustrated) for independent band adjustment.

It should be noted that the belts in FIGS. 1A-1B have been described as a single strand configured to form an inner and outer band. However, it is contemplated that the belt in FIG. 1B can comprise two strands coupled together. In such a configuration, a first end of a first strand is coupled with a first end of a second strand, and a second end of the first strand is coupled with a second end of the second strand. One end of the strands is affixed to a buckle portion such as the buckle portion 120b, while the other end of the strands is threaded together through another buckle portion such as the first buckle portion 120a.

In some embodiments, the belt 105, 105' is coated with material, such as Teflon®, to allow the connector piece 115 to easily move along the belt 105, 105'. At least the inward facing surface of the outer band 105a, 105a' is coated.

In addition or alternatively, the connector piece 115 is coated with material, such as Teflon®, to allow it to easily move along the belt 105, 105'. The connector piece 115 can also be made of a low friction material such as stainless steel.

In addition or alternatively, legs of the connector piece 115 is surround by a hallow cylindrical tube, to allow the connector piece 115 to easily move along the belt 105, 105'.

In some embodiments, the leash assembly 100, 100' can include an adornment 130 coupled to the connector piece 115. For example, the adornment 130 can be a butterfly, train, car, dog bone, mouse or other ornamental design. As the connector piece 115 moves along the belt 105, the butterfly "flies" around the wearer, the train "chugs" around the wearer, or the car "races" around the wearer. It is contemplated that the adornment 130 is removable and exchangeable.

In some embodiments, one end of the leash 110 is coupled with a handheld retractor 125 for retracting and extending the leash 110. The retractor 125 is typically held by a parent of a child using the leash assembly 100 or an owner of a pet using the leash assembly 100. In other embodiments, the connector piece 115 is configured to retract and extend the leash 110.

Figure 2:
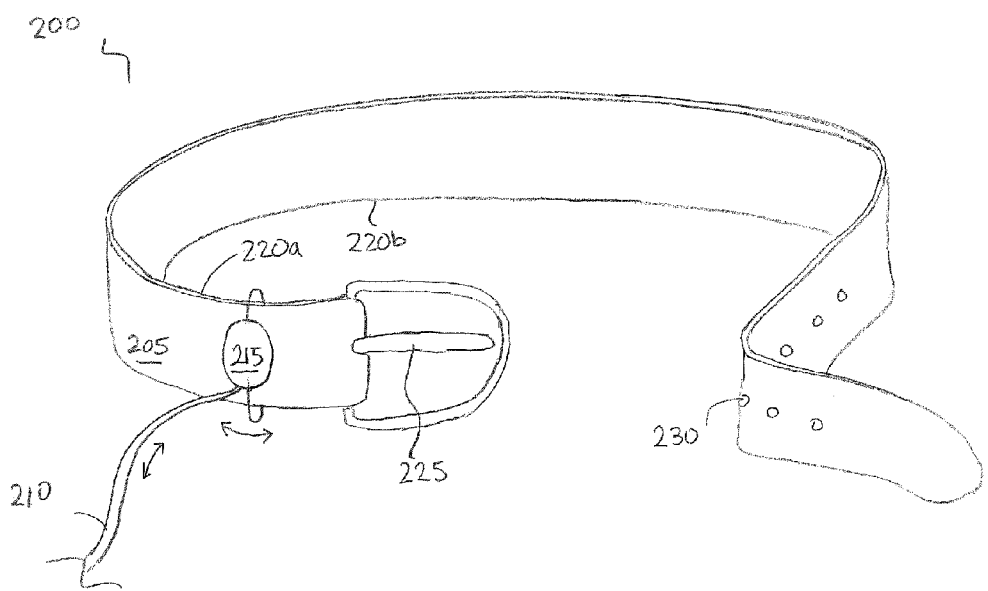
FIG. 2 illustrates a leash assembly using a belt with two tracks thereon in accordance with an embodiment of the present invention.

FIG. 2 illustrates a leash assembly using a belt with two tracks thereon in accordance with the present invention. The leash assembly 200 includes a belt 205, a connector piece 215, and a leash 210. The connector piece 215 is coupled with the leash 210. In some embodiments, the connector piece 215 is configured to allow the leash 210 to rotate about an axis perpendicular to a face of the belt 205. In some embodiments, the connector piece 215 is configured to retract and extend the leash 210.

The belt 205 includes a buckle with a prong 225 and a plurality of holes 230, each configured to receive the prong 225. The belt 205 is adjustable around the wearer of the belt 205. The belt 205 also includes a first track 220a and a second track 220b along the length of the belt 205. Typically, the first track 220a is at a top portion of the belt 205 while the second track 220b is at a bottom portion of the belt 205. For example, as shown in FIG. 2, the first track 220a is along a top edge of the belt 205, and the second track 220b is along a bottom edge of the belt 205. The connector piece 215 is typically C-shaped. A first end of the connector piece 215 couples with and travels on the first track 220a, and a second end of the connector piece 215 couples with and travels on the second track 220b. In some embodiments, the first and second ends of the connector piece 215 are each coupled with a ball or the like so that the connector piece 215 can easily on the first and second tracks 220a, 200b. The balls can be integrally formed with the connector piece 215. This type of buckle typically prevents the connector piece 215 from traveling the entire circumference of the loop formed when the belt 205 is buckled.

Similar to the leash assemblies 100, 100' described above, the leash assembly 200 can also include a handheld retractor coupled to one end of the leash 210. The leash assembly 200 can also include an adornment and/or retractor coupled to the connector piece 215. Although the configuration of one connector piece 215 and one leash 210 is shown in FIG. 2, other configurations can include multiple connector pieces, where each of the connector pieces is coupled with a leash. The connector piece 215 is configured to move along at least a portion of the belt 205.

The buckles illustrated in FIGS. 1A-2 are only exemplary and can be embodied by multiple different configurations. Clip buckle types as shown in FIG. 1A-1B may allow the user to put on or remove the belt more rapidly and better keep previous adjustments for fit. A more traditional belt buckle such as the one shown in FIG. 2 may provide a stronger hold. There are other more secure variants similar to those used on climbing harnesses in which the belt is looped back over itself in the buckle.

Figure 3:
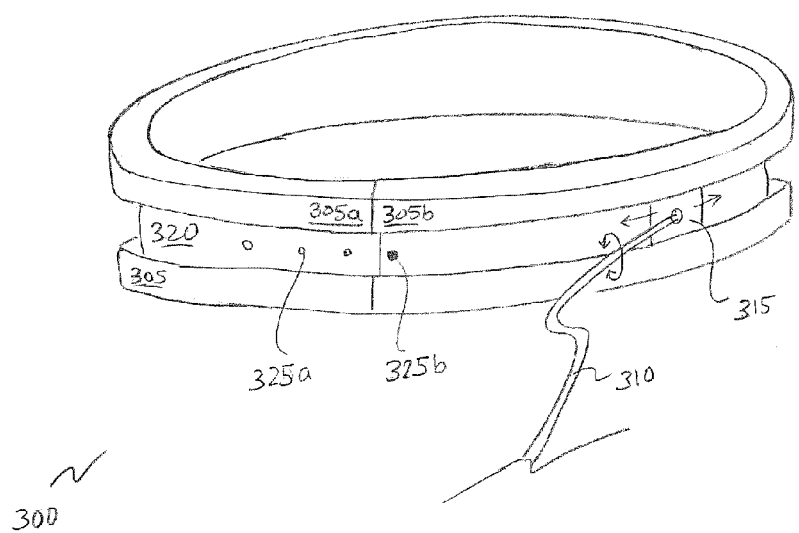
FIG. 3 illustrates a leash assembly using a belt with one track thereon in accordance with an embodiment of the present invention.

FIG. 3 illustrates a leash assembly using a belt with one track thereon in accordance with the present invention. The leash assembly 300 includes a belt 305, a connector piece 315, and a leash 310. The connector piece 315 is coupled with the leash 310. In some embodiments, the connector piece 315 is configured to allow the leash 310 to rotate about an axis perpendicular to a face of the belt 305. In some embodiments, the connector piece 315 is configured to retract and extend the leash 310.

The belt 305 is C-shaped and has a track 320 along the planar surface of the belt 305 which allows the connector piece 315 to move along on. In some embodiments, the connector piece 315 is a planar disk or a ball sized and adapted to fit within the C-shaped channel of the belt 305. Alternatively, the connector piece may include an upper and lower portion adapted to fit within the C-shaped channel 305 and a raised middle portion providing a gap between the connector piece and the middle portion of the track 320 thus allowing the connector piece to move over one or more belt studs 325b protruding through one or more stud sockets 325a. Unlike the previous leash assembles 100, 100', 200 described above, the leash assembly 300 allows the connector piece 315 to travel along the entire circumference of the belt 305 using a different buckling mechanism. Similar to the previous leash assemblies 100, 100', 200 described above, the belt 305 is also adjustable around the wearer of the belt 305. The belt 305 has a first end 305a and a second end 305b. The first end 305a is typically wider than the second end 305b and has means to receive and couple with the second end 305b. For example, a first side of the belt 305 has hooks, and a second side of the belt 305 has loops. For another example, the first side of the belt 305 has studs 325b, and the second side of the belt 305 has corresponding one or more sockets 325a for receiving the studs.

Similar to the leash assemblies 100, 100', the leash assembly 300 can also include a handheld retractor coupled to one end of the leash 310. The leash assembly 300 can also include an adornment and/or retractor coupled to the connector piece 315. Although the configuration of one connector piece 315 and one leash 310 is shown in FIG. 3, other configurations can include multiple connector pieces where each of the connector pieces may be coupled with a leash. The connector piece 315 is configured to move along the entire belt 305.

Figure 4:
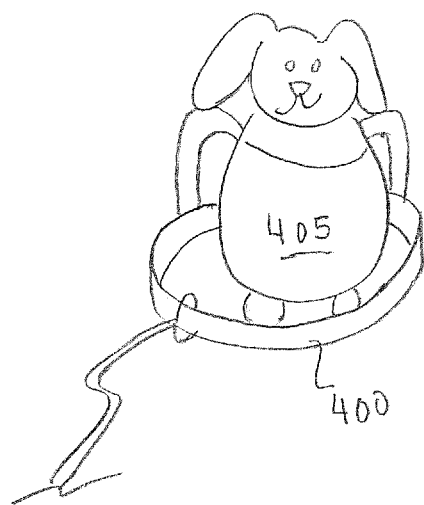
FIG. 4 illustrates a leash assembly including a backpack in accordance with an embodiment of the present invention.

FIG. 4 illustrates yet another leash assembly in accordance with the present invention. The leash assembly 400 is similarly configured as one of the leash assemblies described above. However, the leash assembly 400 further includes a backpack 405. The backpack 405 has at least one body strap to be worn by the wearer. As illustrated in FIG. 4, the backpack 405 includes two shoulder straps that couple with the belt of the leash assembly 400 to be worn by a person.

An advantage of the present invention lies in the ability of a leash to move along at least a portion of a belt worn by a wearer regardless of the wearer's position relative to the holder of the leash. The present invention advantageously allows the wearer to be ahead, behind, the left or the right of the holder of the leash without the leash tangling around the wearer.

While the invention has been described with reference to numerous specific details, one of ordinary skill in the art will recognize that the invention can be embodied in other specific forms without departing from the spirit of the invention. Further, one of ordinary skill having the benefit of this disclosure will readily appreciate that the elements of the several embodiments are interoperable and interchangeable therebetween as necessary to achieve specific application goals. Thus, one of ordinary skill in the art will understand that the invention is not to be limited by the foregoing illustrative details, but rather is to be defined by the appended claims.

We claim:

1. A leash assembly comprising:
   a. a single belt including a first section adapted to form an inner loop and a second section adapted to form an outer loop configured to surround the inner loop, wherein the inner loop is substantially coextensive with the outer loop yet detached from substantially the entire circumference of the outer loop;
   b. a first connector piece coupled with the outer loop, wherein the first connector piece is configured to move along at least a portion of the outer loop, wherein the length of the path of movement of the first connector piece changes in relation to the total circumference of the belt; and
   c. a first leash, wherein a first end of the first leash is coupled with the first connector piece.

2. The leash assembly of claim 1, wherein the first connector piece is configured to release and retract the first leash.

3. The leash assembly of claim 1, wherein a second end of the first leash is coupled to a retractor for releasing and retracting the first leash.

4. The leash assembly of claim 1, wherein each of the first loop and the second loop has an adjustable circumference.

5. The leash assembly of claim 1, wherein the belt includes a buckle having a first portion and a second portion, wherein the first and second buckle portions are adapted to fasten together, wherein the outer loop is threaded through at least one of the first and second buckle portions.

6. The leash assembly of claim 5, wherein the inner loop is threaded through at least one of the first and second buckle portions.

7. The leash assembly of claim 1, wherein when the inner loop is tightened, the outer loop is configured to loosen by the amount tightened, and when the inner loop is loosened, the outer loop is configured to tighten by the amount loosened.

8. The leash assembly of claim 1, wherein the inner loop and the outer loop are configured to be adjusted simultaneously in the same direction.

9. The leash assembly of claim 1, further comprising a second connector piece coupled with the outer belt.

10. The leash assembly of claim 1, wherein the first end of the first leash is configured to rotate about an axis substantially perpendicular to a face of the belt.

11. The leash assembly of claim 1, further comprising an adornment coupled with the first connector piece.

12. The leash assembly of claim 1, further comprising a carrier coupled to the belt.

13. A leash assembly comprising:
   a. a belt including a strap configured to form a plurality of continuous loops, wherein the plurality of continuous loops includes an inner loop and an outer loop surrounding the inner loop such that adjustments of the inner loop and the outer loop occur simultaneously, wherein the inner loop is substantially coextensive with the outer loop yet detached from substantially the entire circumference of the outer loop;
   b. a link coupled to and configured to move along at least a portion of the outer loop; and
   c. a leash coupled with the link.

14. The leash assembly of claim 13, wherein the belt includes a buckle having a first portion and a second portion wherein the first and second buckle portions are adapted to fasten together.

15. The leash assembly of claim 14, wherein ends of the strap are coupled together.

16. The leash assembly of claim 15, wherein the coupled ends of the strap are affixed to one of the first and second buckle portions.

17. The leash assembly of claim 13, wherein when the inner loop is tightened, the outer loop is configured to loosen by the amount tightened, and when the inner loop is loosened, the outer loop is configured to tighten by the amount loosened.

* * * * *